United States Patent

[11] 3,618,617

[72] Inventors Lauren W. Gates
Rio Vista;
Michael J. Hartwig, Walnut Creek, both of Calif.
[21] Appl. No. 725,874
[22] Filed May 1, 1968
[45] Patented Nov. 9, 1971
[73] Assignee The Regents of the University of California
Berkeley, Calif.

[54] SEPARATOR FOR TOMATO HARVESTER AND THE LIKE
26 Claims, 14 Drawing Figs.

[52] U.S. Cl. .................................................. 130/30, 171/27, 209/308
[51] Int. Cl. .................................................. A01d
[50] Field of Search ....................................... 171/13, 14, 26, 28, 62, 27; 130/30, 30 A, 30 J; 209/308, 309, 365, 365.1, 365.3

[56] References Cited
UNITED STATES PATENTS

| | | | |
|---|---|---|---|
| 1,999,673 | 4/1935 | Weber | |
| 2,559,965 | 7/1951 | Innes | 209/365 |
| 3,199,604 | 8/1965 | Lorenzen et al. | 171/13 |
| 3,294,094 | 12/1966 | Dreyer | 171/27, 130/30 A |
| 3,420,239 | 1/1969 | Lorenzen | 171/27 |

*Primary Examiner*—Antonio F. Guida
*Attorney*—Owen, Wickersham & Erickson

ABSTRACT: A separator for mechanical harvesters of the type where the fruit or other heavy part of the crop is separated from the remainder of the plant by a shaking action. A generally rectangular frame has a front end where harvested plants are introduced and a rear end where they leave. A rockshaft supports the front end of the frame for substantially pure fore-and-aft movement, while crank means support the rear end of the frame and drive it as a unit in a generally circular motion involving both vertical and fore-and-aft components. There is a plurality of pulleys at each end of the frame, those on the rear end being mounted on the crank pin and driven by the crank means, those on the front end being idlers individually spring mounted. The pulleys carry a plurality of closed-loop belts with upwardly extending projections for engaging harvesting plants and moving them from the front to the rear of the frame. A collecting conveyor beneath the frame catches the fruit shaken from said plant and conveys it elsewhere. Thus, the more easily loosened fruit is shaken off by fore-and-aft shaking while the fruit more difficult to loosen is shaken off by the gradual introduction of vertical movement as the crop moves rearwardly. The belt, pulleys, and belt guides are also novel in structure.

3,618,617
SHEET 1 OF 4
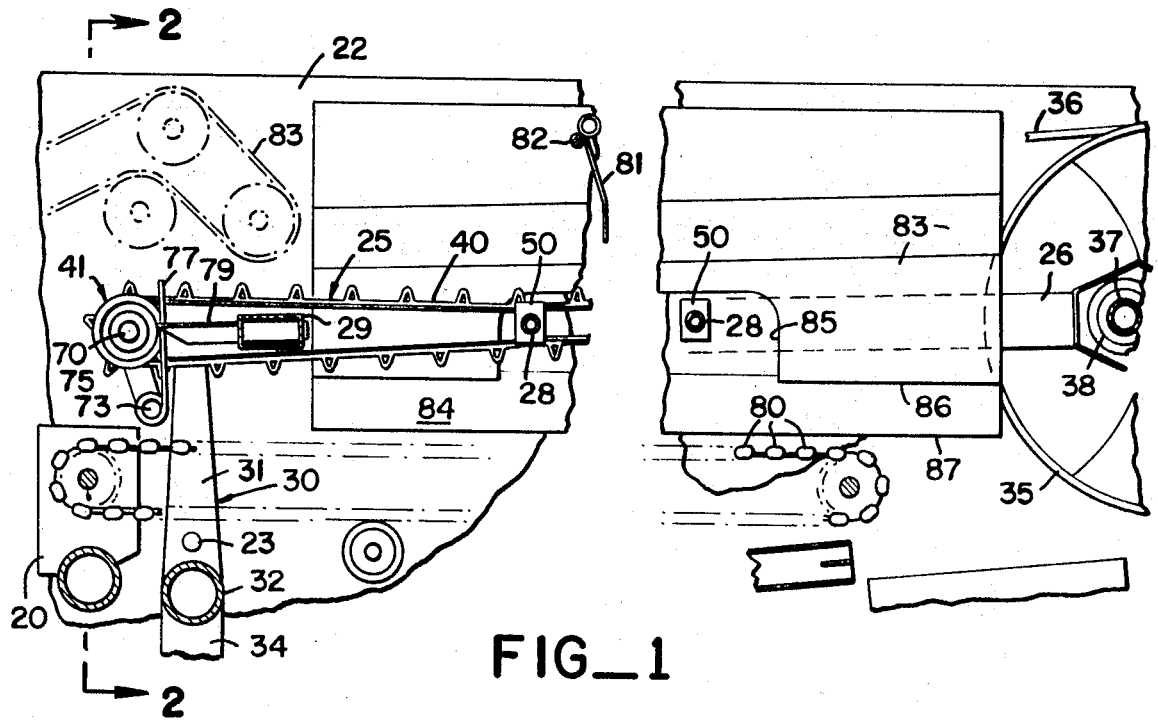
FIG_1
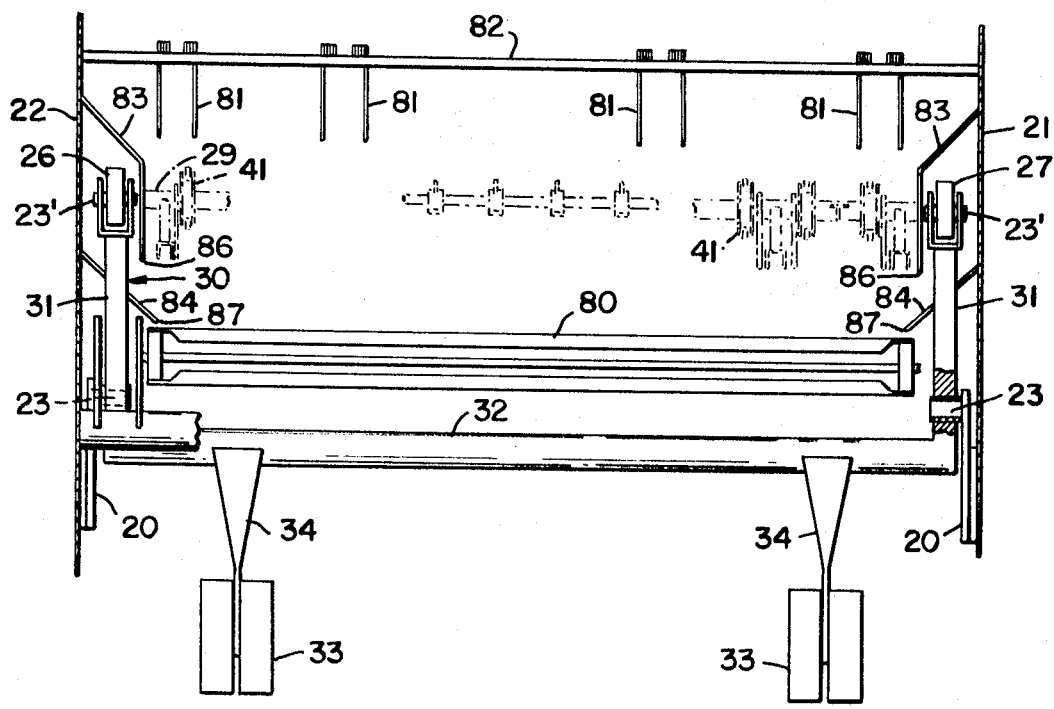
FIG_2
INVENTORS
LAUREN W. GATES
BY MICHAEL J. HARTWIG
Owen, Wickersham & Erickson
ATTORNEYS

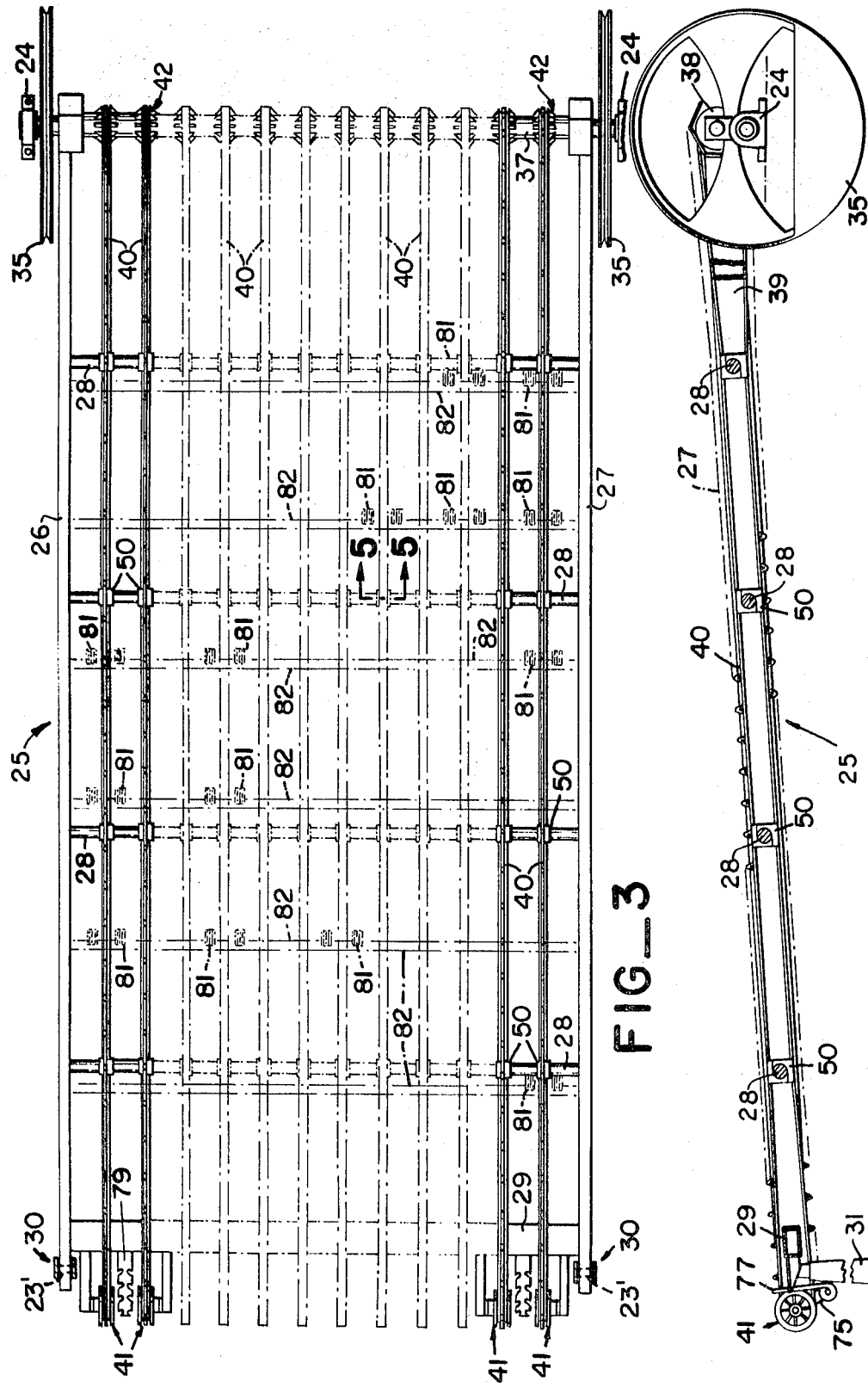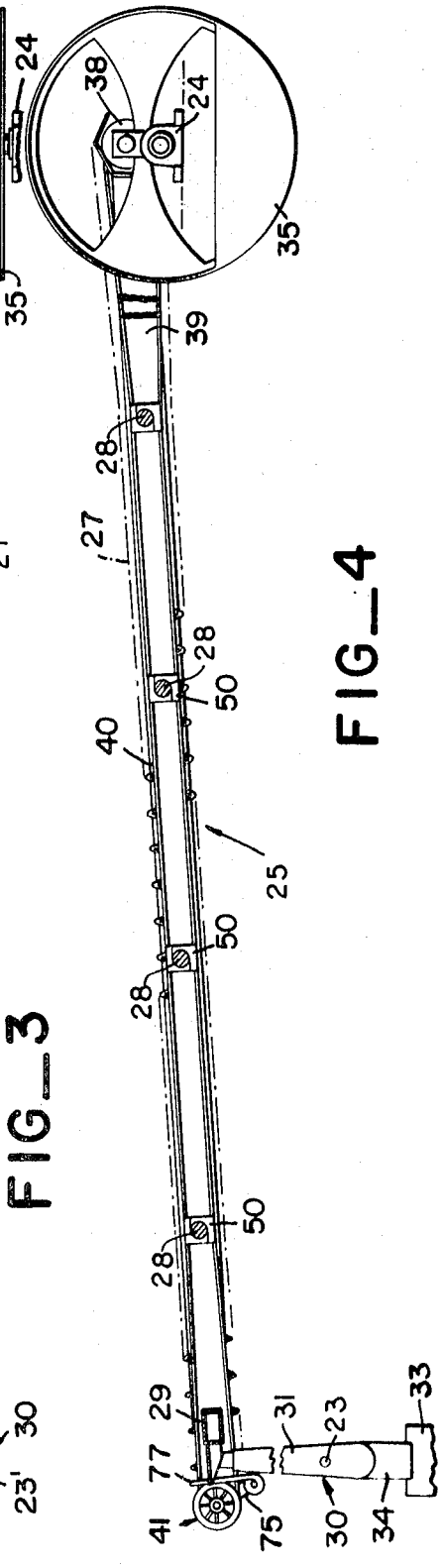

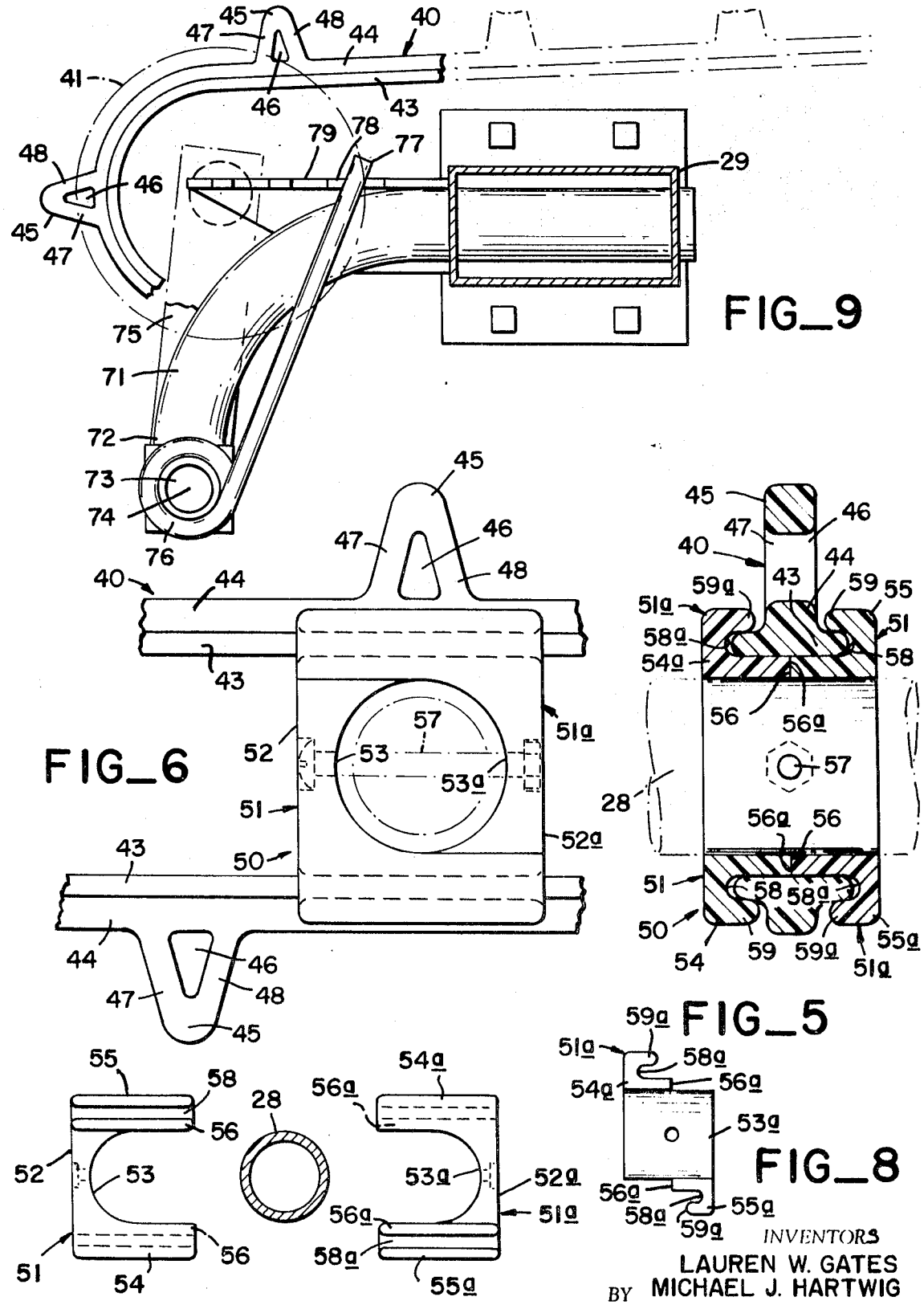

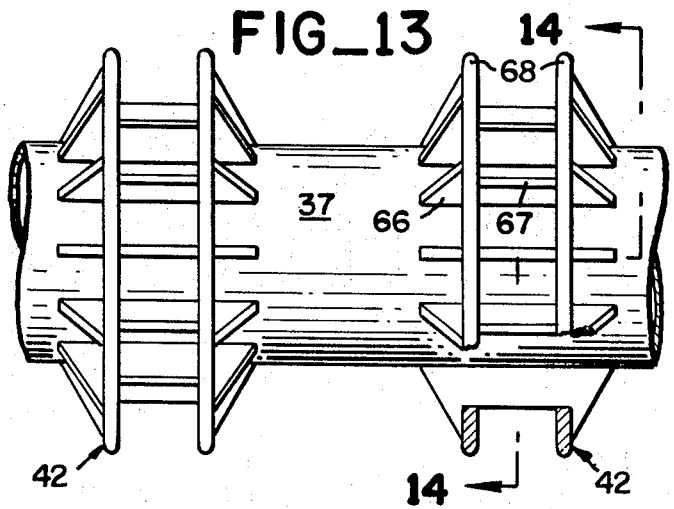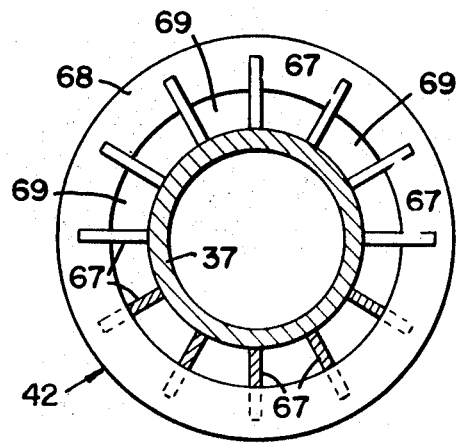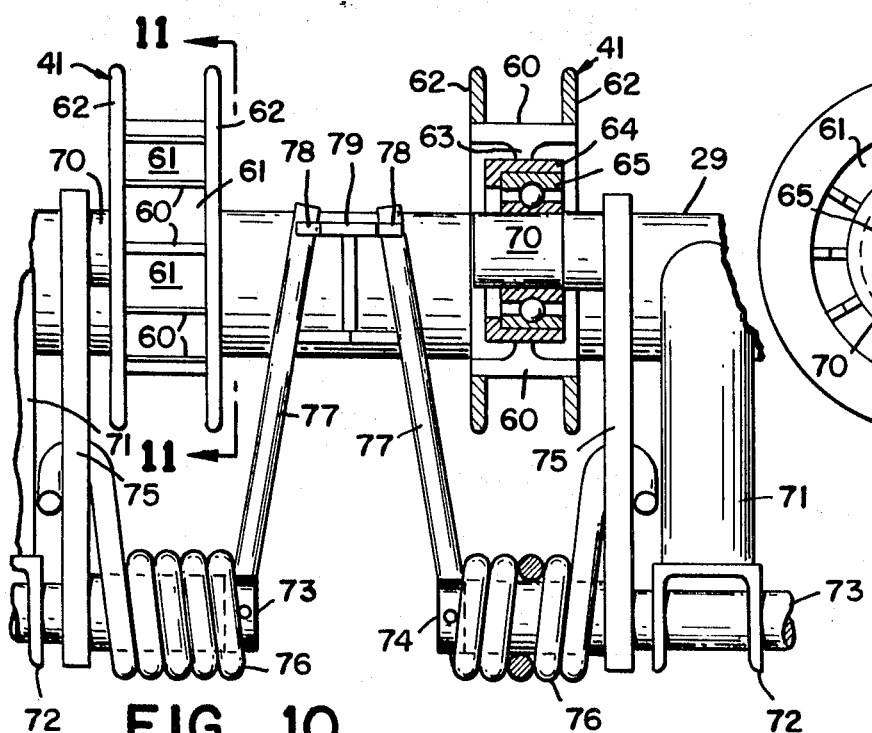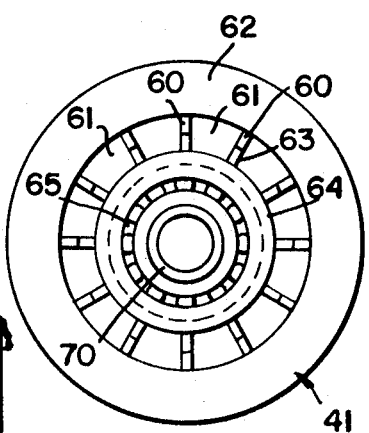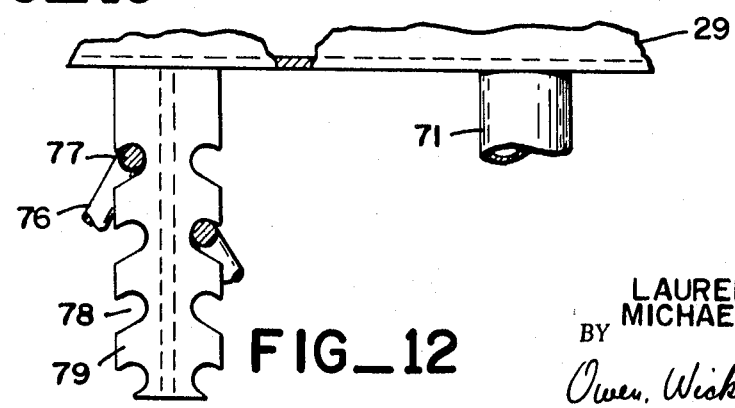

SEPARATOR FOR TOMATO HARVESTER AND THE LIKE

This invention relates to an improved separator device for agricultural harvesting apparatus such as a tomato harvester, in which fruit is shaken loose from the other parts of the plant.

One of the critical steps in harvesting vine crops, such as tomatoes, is the separation of the fruit from the vine. In most tomato harvesters this is done by one or another of several kinds of shaking apparatus which shake the tomatoes loose from the vine so that it drops onto a collecting conveyor below the shaking apparatus. This invention relates to improvements in the shaking apparatus.

The separators heretofore used in tomato harvesters have had two principal disadvantages: (1) they have tended to damage the fruit during the shaking and collection, and (2) they have tended to slow down the harvesting operation as a whole. For example, the fastest tomato harvester in commercial operation in 1967 had a maximum capacity of 35 to 36 tons per hour of harvested tomatoes in a field having a yield of about 23 tons per acre, and had a maximum ground speed, due to this capacity, of approximately 1¼ miles per hour. The present invention has already enabled a capacity of at least 60 tons per hour in such a field and has achieved harvesting ground speeds of at least 2 2/10 miles per hour—very substantial improvements over the best capacities and speeds heretofore available, and even better rates are expected from other machines embodying this invention. Moreover, this apparatus does this not by trying to handle more rows of tomatoes with a larger machine but in a machine that is of substantially the same size of that heretofore employed, differing almost solely by having the more efficient shaking apparatus of this invention.

Similarly, the damage rate to tomatoes being harvested has in the past been between 10 and 20 percent of the harvested fruit, and the damaged tomatoes have had to be discarded during sorting if they were not to result in rejection of the whole crop by the canner to which the tomatoes were taken. Most, but not all, of this damage occurred during shaking. Tests on early models of the device of the present invention have indicated that the total amount of damaged fruit has been reduced to a total of about 6 to 11 percent of the harvested fruit, and this amount is expected to be further reduced by other harvesters embodying this invention. Furthermore, it appears that most of *this* damage does not occur in the separation step but is due to other things, such as damage that happened when the crop was picked up from the ground, damage inflicted during the growing period, and damage occurring during sorting or during transfer elsewhere. Damage due to these remaining causes can be reduced by other expedients; so that it is expected that the total amount of damage can be reduced quite substantially.

Thus, the present invention achieves both a higher rate of separation and a lower rate of damage, so that the economy of mechanical harvesting of such crops as tomatoes is greatly enhanced.

Tomato harvester separators heretofore in use have been mainly of two kinds: one vibrated the vines in a back and forth movement only; another vibrated them both up and down and back and forth over their entire path. Of these two types, the latter was by far the more effective, although it tended to result in some increase in the damage rate. Mere back-and-forth vibration of the vines has often failed to recover a satisfactory amount of the crop, much less than is recovered by the combination of up-and-down with back-and-forth shaking, and has therefore substantially reduced the yield obtained from the field. Similarly, back-and-forth vibration has usually meant very slow operation, with substantial reduction in yield rate.

The present invention is characterized by a combination of these two types of motion in a novel and efficient way which produces a new result. Thus, there is strict fore-and-aft movement at the front end of the separator for loosening easily loosened tomatoes from the vine; then as the vines progress rearwardly along the separator, up-and-down motion is introduced and its amplitude increased, to harvest the somewhat less ripe tomatoes and other tomatoes which are more difficult to separate from the vine but which are also more resistant to damage by bruising. In contrast with the best separators heretofore in use, in which the up-and-down motion has been achieved by oppositely moving alternate pairs of walking bars, the present invention has no such oppositely moving pairs, but its up-and-down movement is achieved in a rear portion of an apparatus which moves up and down as a unit, and this has been found to minimize damage to the tomatoes by eliminating the situation in which some tomatoes were thrown up into the air and then fell down on an upwardly moving bar. Fruit removal from the vines appears to be even better and more efficient, while the damage rate is dropped; in fact, as implied earlier, the absolute damage rate is approximately halved while the recovery-per-time rate is approximately doubled.

With the present invention the harvesting speed is limited mainly by the speed at which the vines can be picked up from the ground, whereas before this invention the separator was the main limiting factor in determining the harvesting speed.

In the present invention the separator comprises a frame having a series of rearwardly moving conveyor belts that pull the vine towards the rear of the separator. The forward part of the frame is supported on a rockshaft structure for substantially pure fore-and-aft movement, whereas the rear portion of the frame is mounted on a crankshaft for a combination fore-and-aft and up-and-down movement. The conveyor belts are driven in a novel manner by the crankshaft, and counterbalancing eliminates excessive inertial forces and other nonuseful forces of vibration. Several novel features of construction will be better appreciated upon description of the apparatus as a whole.

Other objects and advantages of the invention will appear from the following description of a preferred embodiment of the invention.

In the drawings:

FIG. 1 is a fragmentary view in side elevation and partly in section of a separator portion of a tomato harvester embodying the principles of the invention, broken in the middle to conserve space, with the viewpoint of the right-hand portion at a different plane from that of the left hand portion.

FIG. 2 is a view in section taken along the line 2—2 in FIG. 1.

FIG. 3 is a top plan view of the moving parts of the separator, the center portion being shown in phantom with some parts omitted, since it is identical to the solid-line portion nearby. Also the depending tines that are shown in FIGS. 1 and 2 are indicated in phantom.

FIG. 4 is a view in side elevation of the apparatus of FIG. 3.

FIG. 5 is a view in elevation and in section on an enlarged scale of one of the belt guiding members, taken along the line 5—5 in FIG. 3.

FIG. 6 is a view in side elevation of the portion of the device of FIG. 5.

FIG. 7 is an exploded view on a somewhat smaller scale of the main stationary elements of FIG. 6.

FIG. 8 is an end view of one of the members of FIG. 7.

FIG. 9 is an enlarged fragmentary view in side elevation of the forward end of the separator of FIG. 3.

FIG. 10 is a fragmentary front elevational view partly in section of the forward end of FIG. 9.

FIG. 11 is a view in elevation of one of the front pulley wheels, taken along the line 11—11 in FIG. 10.

FIG. 12 is a fragmentary enlarged top plan view partly in section of the locking means for the springs of FIG. 10.

FIG. 13 is a fragmentary view in rear elevation, partly broken away and shown in section, of a portion of the shaft and pulley members of the rear crankpin.

FIG. 14 is a view in section taken along the line 14—14 in FIG. 13.

The separator of this invention may be used as part of a self-propelled tomato harvester which is supported on wheels and moves through a field, carrying with it, as a part of its main frame 20 or rigidly attached to it, a pair of sidewalls 21 and 22, one at each side of the harvester. The main frame 20 also carries fixed bearings 23 at the front and fixed bearings 24 at the rear (see FIG. 4) for support of a separator frame 25 shown best in FIGS. 3 and 4. The separator frame 25 includes two side members 26 and 27 to which are secured a series of crossmembers 28 and a front crossmember 29. The members 26, 27, 28, and 29 are all secured together as by welding to provide a substantially unitary frame 25.

The front crossmember 29 may be supported on a rockshaft assembly 30 having a pair of link portions 31 that are each effectively journaled on the elastomeric bearings 23 fixed to the frame 20 and are journaled to the side frame members 26 and 27 by elastomeric bearings 23'. The rockshaft assembly 30 also includes a crossmember 32 joining the links 31 together, and it is preferably equipped with a pair of counterweights 33 depending from arms 34 secured to the crossmember 32 and opposite the point on the rockshaft assembly 30 to which the separator side frame members 26 and 27 are attached. The reciprocating mass of the frame 25 (or that portion of the mass which may be considered to be reciprocating in the slider crank mechanism) requires the counterbalance 33 in order to avoid excessive inertial forces from driving the harvester frame 20 in a reciprocating manner. The mass of the counterweight 33 thus acts to oppose the mass which is reciprocating on the separator itself. The rockshaft 30 and bearings 23 thus provide the front support for the separator side frame members 26 and 27.

The rear of the separator frame 25 is carried by two sheaves 35 that are supported by the stationary fixed bearings 24 and are driven by belts 36 from a power source elsewhere on the machine and not shown here. A long crankpin 37 is supported by the sheaves 35 offset from the bearings 24; and the frame members 26 and 27 are connected to offset bearings 38. The crankpin 37 extends all the way across the separator frame 25.

A series of endless belts 40 are carried by a series of front pulleys 41 and by a series of rear pulleys 42 mounted rigidly on the crankpin 37 (see FIGS. 13 and 14), which both drive and support the rear of a series of endless belts 40. Since all the pulleys 42 on the crankpin 37 are on the same centerline, they move with the same motion. The bearings 24 connected to the main frame 20 establish a fixed relationship between the rear or crankshaft end of the separator frame 25 and the elastomeric bearings 23' for the rockshaft assembly 30, which, in turn, supports the forward end of the separator frame 25. The pulleys 42 rotate the belts 40 in a manner to be explained, and therefore drive them so as to carry the vine along over the separator frame 25.

The belts 40 of this separator are in themselves unique, as shown in FIGS. 5, 6, and 9. A lower or flange portion 43 comprises the belt's tensile member; on the upper surface of this flanged portion 43 is erected a rib 44 extending the full length of each belt 40. On that rib 44 at spaced intervals, for example 3 to 5 inches, or 4 inches in a typical case, are projections 45 which extend upwardly on the upper course and downwardly on the lower course. On the upper course, the projections 45 extend into the vine or other material being transferred by the belts 40 and reduce the amount of slippage between the belt 40 and the vine. The projections 45 are preferably not solid but are made with a hollow center 46 between upstanding legs 47 and 48, rather small in section and free to flex, so that when the belts 40 turn around its pulleys 41 and 42, the projections 45 do not produce excessive stiffness, which could not be tolerated by the belts 40 in the use of small diameter pulleys. The hollow construction enables the use of the small diameter pulleys 41 and 42 and enables the operation to be efficient and helps the belts 40 to last a long time.

The belts 40 are supported and guided intermediate the pulleys 41 and 42 by a series of guide assemblies 50, each mounted on the crossmember 28 (see FIGS. 5-8). Each guide assembly is made of two identical pieces 51 and 51a, which are inverted to face each other and are locked together. An end wall 52, 52a with a semicircular inner face 53, 53a has two projecting horizontal members 54 and 55 (or 54a and 55a), each half as wide as the wall 52 or 52a and projecting from the opposite side. The members 54 and 54a have side walls 56, 56a, that come against each other, the two pieces 51 and 51a then being secured together by a bolt 57. The pieces 51 and 51a have recesses 58, 58a, and flanges 59, 59a that loosely receive and guide the belt's flanges 43. Being held to each other by the bolts 57 and supported thereby also on the cross members 28, these pieces 51 and 51a are readily disassembled and reassembled in the field, for repair or replacement of parts. Both the upper and lower reaches of the belt 40 are so supplied.

Preferably, the pulleys 41 and 42 over which the belts 40 move are not simple flat-surface pulleys, although they are basically similar. The pulleys 41 at the front of the frame 25 are constructed of a series of axially oriented elements 60 with large spaces 61 in between them, in order to enable dirt carried by the belts 40 to drop off beneath flanges 62 and beneath the belts 40, rather than being trapped between the surface of the belt 40 and the pulley 41 as would be the case with a conventional flat-surface pulley. Each element 60 has a narrow central supporting portion 63 to facilitate this cleaning, the portion 63 being recessed to a hub 64 which is mounted on a ball bearing 65.

At the rear of the machine the pulleys 42 are similar but are somewhat different; they have generally trapezoidal plates 66, with recessed central portions 67 that instead of being welded to bearing housings in the center are rather welded to the crankpin 37. The recessed portions of the plates 66, which may be called spokes, are welded to a pair of flanges or rims 68 that are spaced away from the shaft 37, leaving openings 69 sufficient to provide adequate wear life and strength and to support the belts 40 throughout the life of the pulley 42. The openings 69 and 61 between the flanges 68 or 62 and the hub 64 or shaft 37 reduce the area into which it is possible to jam soft earthy material such as mud, and since there is a tendency for mud to stick and jam at that point, this has been counteracted by the fact that mud, when forced far enough down between the spokes, reaches a relieving undercut area which enables it to break up and become less confined and therefore lets it fall out the sides of the pulleys.

At the product-receiving or forward end of the separator, each pulley 41 is supported by a ball bearing 65 on an individual spring-loaded shaft 70. The belts 40 employ these forward pulleys 41 as idlers and drive them in an idling fashion, but are dependent on them for tension which is provided by the spring-loading mechanism supporting each individual pulley 41. For these purposes, the front crossmember 29 of the separator subframe 25 may be a rectangular tube; rigidly attached to the member 29 is a series of 90° arcuate members 71, each of which may be made from a circular tube (see FIG. 9). Clevises 72 at the forward and lower extremities of all of these members 71 preferably carry a series of stub shafts 73 all on a common centerline 74 (see FIG. 10). Arms 75, each rotatably mounted on a stub shaft 73, carry a pulley shaft 70 for one idler pulley 41. The idler arms 75 are urged to their position by a very heavy torsion spring 76, each individually mounted to the stub shaft 73 and having a projecting end 77 that is placed in a notch 78 of an assembly locking bar 79, so that the belts 40 are kept tight. The belt tension balances the spring tension.

The rockshaft 30 and crankpins 37 result in a combination slider-crank mechanism which is a very important feature of the invention. The frame 25, which is primarily responsible for separating the product from the vines, moves at its receiving or forward end in a nearly linear manner, almost as though it were reciprocating on a plane. Upon this end the vines drop onto the separator from the elevator device, which brings them to a point above the separator and then disengages them. Thus, as the vines drop upon the separator, they are supported by a bed made up of the series of spaced separator belts 40 with the impaling members 45 that extend upwardly and cause the vine to move to the rear, since the members 45 become entangled in the vine. The motion at the front end, similar to that of a purely reciprocating slider crank mechanism, is fairly rapid. This rapid reciprocation orients the vine and the fruit thereon and obtains a degree of initial separation, so that the ripest or most easily loosened fruit falls off at this point where it is being treated most gently and where it simply falls gently down to a collector belt 80, which is below, and near to it, and which may be that shown in U.S. Pat. No. 3,206,011.

In addition to the slider crank motion, there is the up-and-down movement caused by the crankshaft, for at the discharge end the rotating crankpin 37 carries the rotating flat pulleys 42 which individually support, guide, and drive the individual separator belts 40. Thus, the up-and-down movement begins with very small amplitude near the front end of the frame 25, where an elevator conveyor 83 drops the fruit, and gradually builds up to a maximum at the crankpin 37. Hence, the somewhat less ripe fruit or fruit which is otherwise more difficult to detach from the vine is detached from the vine. The throw of the crankpin 37 is set so that it detaches the desirable fruit with few culls and leaves on most of the green fruit which would have to be culled out.

Another feature of the invention is the combination with the separator 25 of off-the-centerline tines 81 that depend from rods 82 that overlie the separator 25. The rods 82 extend transversely between the walls 21 and 22 at a plurality of locations in between the front of the separator 25 and its rear. The tines 81, preferably made in pairs, are disposed generally vertically and are located asymmetrically along any one rod 82. The idea is to achieve some rotation of the vines as they move to the rear, by engagement with these off-the-axis tines 81; the tines impale a vine and slow the progress of part of it, while the rest of the vine continues to move along the separator belts 40. Hence, the vine is somewhat rotated at least once and often more than once, while it is on the separator 25. As a result, the vine is subjected to more thorough separation of its fruit than if it proceeded without such rotary movements.

To protect the tomatoes from being damaged by being trapped between the side frame members 26 and 27 and the sidewalls 21 and 22, a shield 83 is located on each side of the separator 30. For similar reasons and to assure collection of the tomatoes on the conveyor 80, a shield 84 extends out from each sidewall 21 and 22.

The shields 83 slope down from their supporting sidewalls 21 and 22 and then extend down vertically between the side frame members 26 and 27 and the rest of the separator 30. Slots 85 extend up from the lower edges 86 of the shields wherever there is a cross member 28 to enable reciprocation of the separator 30. The edges 86 otherwise lie close to the separator 30 and extend below it. Thus, the tomatoes are kept from damage by being retained within the area of the separator 30. Similarly, the shields 84 have a lower edge 87 just above the conveyor 80, so that the tomatoes are guided to the collecting conveyor 80 and cannot fall off to one side thereof.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A separator for mechanical harvesters of the type where the fruit or other heavy part of the crop is separated from the remainder of the plant by a shaking action, comprising
   a generally rectangular frame having a front end where harvested plants are introduced and a rear end where they leave,
   rocking means supporting the front end of the frame for substantially pure fore-and-aft movement,
   rotating crank means supporting the rear end of the frame and for driving it as a unit in a generally closed circular motion path involving both vertical and fore-and-aft components, and
   carrying means for moving harvested plants from front to rear of said frame, all points on any transverse line across said carrying means being at all times at substantially the same level, so that the easily loosened fruit is shaken off by fore-and-aft shaking and so that fruit more difficult to loosen is shaken off by the gradual introduction of vertical movement as the crop moves rearwardly.

2. The separator of claim 1 having a plurality of depending tines above said frame at off-the-centerline locations, for reorienting the plants during their movement over said frame.

3. The separator of claim 1 wherein said carrying means comprises a plurality of endless belts mounted lengthwise along said frame and having a plurality of outwardly extending projections thereon.

4. A separator for mechanical harvesters of the type where the fruit or other heavy part of the crop is separated from the remainder of the plant by a shaking action, comprising
   a generally rectangular frame having a front end where harvested plants are introduced and a rear end where they leave,
   rocking means supporting the front end of the frame for substantially pure fore-and-aft movement,
   crank means supporting the rear end of the frame and for driving it as a unit in a generally circular motion involving both vertical and fore-and-aft components, and
   carrying means for moving harvested plants from front to rear of said frame, so that the easily loosened fruit is shaken off by fore-and-aft shaking and so that fruit more difficult to loosen is shaken off by the gradual introduction of vertical movement as the crop moves rearwardly, said carrying means comprising a plurality of endless belts mounted lengthwise along said frame and having a plurality of outwardly extending projections thereon,
   said belts being mounted on polygonal pulleys at the rear end and said pulleys being mounted on a crank pin so as to propel said belts as said pin moves around its path.

5. The separator of claim 4 wherein each of said pulleys comprises a pair of side flanges held by transverse members away from an inner member, so that mud can leave said pulley inwardly of said flanges.

6. The separator of claim 5 wherein in some of said pulleys said transverse members comprise a narrow portion affixed to a hub as said inner member and a wide outer portion affixed to said flanges.

7. The separator of claim 5 wherein in some of said pulleys said transverse members are generally trapezoidal in shape, the larger base being affixed to said inner member and the smaller base being affixed to said flanges.

8. A separator for mechanical harvesters of the type where the fruit or other heavy part of the crop is separated from the remainder of the plant by a shaking action, comprising
   a generally rectangular frame having a front end where harvested plants are introduced and a rear end where they leave,
   rocking means supporting the front end of the frame for substantially pure fore-and-aft movement,
   crank means supporting the rear end of the frame and for driving it as a unit in a generally circular motion involving both vertical and fore-and-aft components, and
   carrying means for moving harvested plants from front to rear of said frame, so that the easily loosened fruit is shaken off by fore-and-aft shaking and so that fruit more difficult to loosen is shaken off by the gradual introduction of vertical movement as the crop moves rearwardly, said carrying means comprising a plurality of endless belts mounted lengthwise along said frame and having a plurality of outwardly extending projections thereon,
   said belts having a wide base portion with a base flange and a narrow upper portion from which said projections emerge.

9. The separator of claim 8 wherein said projections are generally triangular with a hollow portion in between the angular legs.

10. The separator of claim 8 wherein said frame is provided with a plurality of guides for the belts having channels for guiding said flanges.

11. A separator for mechanical harvesters of the type where the fruit or other heavy part of the crop is separated from the remainder of the plant by a shaking action, comprising a generally rectangular frame having a front end where harvested plants are introduced and a rear end where they leave, rocking means supporting the front end of the frame for substantially pure fore-and-aft movement, rotating crank means supporting the rear end of the frame and for driving it as a unit in a generally circular closed path involving both vertical and fore-and-aft components, and a plurality of pulleys at each end of said frame, those on said rear end being driven by said crank means, all said pulleys being in phase with each other, a plurality of closed-loop belts on said pulleys, each driven by a said rear pulley and all vertically in phase with each other, said belts carrying upwardly extending projections for engaging harvested plants and moving them from front to rear of said frame and a collecting conveyor beneath said frame for catching the fruit shaken from said plant and conveying it elsewhere, whereby the easily loosened fruit is shaken off by fore-and-aft shaking and so that fruit more difficult to loosen is shaken off by the gradual introduction of vertical movement as the crop moves rearwardly.

12. The separator of claim 11 wherein the pulleys at the front end of said frame are idler pulleys that are individually spring mounted to maintain belt tension.

13. A separator for mechanical harvesters of the type where the fruit or other heavy part of the crop is separated from the remainder of the plant by a shaking action, comprising a generally rectangular frame having a front end where harvested plants are introduced and a rear end where they leave, rocking means supporting the front end of the frame for substantially pure fore-and-aft movement, crank means supporting the rear end of the frame and for driving it as a unit in a generally circular motion involving both vertical and fore-and-aft components, and a plurality of pulleys at each end of said frame, those on said rear end being driven by said crank means, the pulleys at the front end of said frame being idler pulleys that are individually spring mounted to maintain belt tension, a plurality of closed-loop belts on said pulleys, each driven by a said rear pulley, said belts carrying upwardly extending projections for engaging harvested plants and moving them from front to rear of said frame, and a collecting conveyor beneath said frame for catching the fruit shaken from said plant and conveying it elsewhere, whereby the easily loosened fruit is shaken off by fore-and-aft shaking and so that fruit more difficult to loosen is shaken off by the gradual introduction of vertical movement as the crop moves rearwardly;

each said belt having a horizontal base flange and a narrow portion thereabove from which said projections arise.

14. The separator of claim 13 wherein each projection has a forward sloping leg and a rear sloping leg with a hollow below the vertex and near the base between the legs.

15. The separator of claim 14 wherein said frame has a plurality of crossmembers to which are secured guide members, each comprising a pair of identical members readily taken off and providing, when assembled, channels to receive said base flanges.

16. The separator of claim 11 having a plurality of depending tines above said frame at off-the-centerline locations, for reorienting the plants during their movement over said frame.

17. A separator for mechanical harvesters of the type where the fruit or other heavy part of the crop is separated from the remainder of the plant by a shaking action, comprising a generally rectangular frame having a front end where harvested plants are introduced and a rear end where they leave, rocking means supporting the front end of the frame for substantially pure fore-and-aft movement, crank means supporting the rear end of the frame and for driving it as a unit in a generally circular motion involving both vertical and fore-and-aft components, and a plurality of pulleys at each end of said frame, those on said rear end being driven by said crank means, said pulleys comprising radially extending plates separated from each other, side flanges supported by said plates and separated from a central member, enabling mud to pass out through the openings provided by the separations, a plurality of closed-loop belts on said pulleys, each driven by a said rear pulley, said belts carrying upwardly extending projections for engaging harvested plants and moving them from front to rear of said frame and a collecting conveyor beneath said frame for catching the fruit shaken from said plant and conveying it elsewhere, whereby the easily loosened fruit is shaken off by fore-and-aft shaking and so that fruit more difficult to loosen is shaken off by the gradual introduction of vertical movement as the crop moves rearwardly.

18. A vine moving means for a separator in a mechanical harvester of the type where the fruit or other heavy part of the crop is separated from the remainder of the plant by a shaking action, said separator having a generally rectangular frame having a front end where harvested plants are introduced and a rear end where they leave, and crank means with a crankpin and supporting the rear end of the frame and for driving it as a unit in a generally circular motion, said vine-moving means comprising a plurality of pulleys at each end of said frame, those on said rear end being mounted on said crankpin and driven by said crank means, those on the forward end being individually spring mounted, and a plurality of closed-loop belts on said pulleys, each driven by a said rear pulley, said belts carrying upwardly extending projections for engaging harvesting plants and moving them from front to rear of said frame.

19. The vine moving means of claim 18 wherein said belts have a wide base portion with a base flange and a narrow upper portion from which said projections emerge.

20. The vine moving means of claim 19 wherein said projections are generally triangular with a hollow portion in between the angular legs.

21. The vine moving means of claim 19 wherein said frame is provided with a plurality of guides for the belts having channels for guiding said flanges.

22. The vine moving means of claim 21 wherein said frame has a plurality of crossmembers to which are secured said guide members, each said guide member comprising a pair of identical members readily taken off and providing, when assembled, channels to receive said base flanges.

23. The vine moving means of claim 18 wherein each of said pulleys comprises a pair of side flanges held by transverse members away from an inner member, so that mud can leave said pulley inwardly of said flanges.

24. The vine moving means of claim 23 wherein in some of said pulleys said transverse members comprise a narrow portion affixed to a hub as said inner member and a wider outer portion affixed to said flanges.

25. The vine moving means of claim 23 wherein in some of said pulleys said transverse members are generally trapezoidal in shape, the larger base being affixed to said inner member and the smaller base being affixed to said flanges.

26. A separator for mechanical harvesters of the type where the fruit or other heavy part of the crop is separated from the remainder of the plant by a shaking action, comprising a pair of sidewalls on said harvester, a generally rectangular frame between said sidewalls having a front end where harvested plants are introduced and a rear end where they leave and having a pair of side frame members joined together by cross frame members, rocking means supporting the front end of said side frame members for substantially pure fore-and-aft movement, rotating crank means supporting the rear end of said side frame members and for driving said frame as a unit in a generally circular motion involving both vertical and fore-and-aft components, carrying means for moving harvested plants from front to rear of said frame, all points on any transverse line across said carrying means being in phase with each other and at substantially the same level as each other at all times, so that the easily loosened fruit is shaken off by fore-and-aft shaking and so that fruit more difficult to loosen is shaken off by the gradual introduction of vertical movement as the crop moves rearwardly, and shield means extending out from said harvester sidewalls and down between said side frame members and the rest of said frame, to protect tomatoes from getting between said side frame members and said sidewalls and to restrict them to an area within said frame.

* * * * *